United States Patent [19]

Labriola

[11] Patent Number: 5,219,094
[45] Date of Patent: Jun. 15, 1993

[54] AUTOMATIC DISPENSER, PARTICULARLY FOR AUDIO/VIDEO PRODUCTS

[75] Inventor: Manlio Labriola, Turin, Italy

[73] Assignee: A.S.E.T. Apparecchiature Strumenti Elettromeccanici Torino S.p.a., Volpiano, Italy

[21] Appl. No.: 795,202

[22] Filed: Nov. 19, 1991

[30] Foreign Application Priority Data

Nov. 28, 1990 [IT] Italy ............................... 53390/90[U]

[51] Int. Cl.$^5$ ............................................. G07F 11/52
[52] U.S. Cl. ...................................... 221/76; 221/122; 221/132; 414/280
[58] Field of Search ...................... 221/13, 76, 89, 119, 221/120, 121, 122, 130, 132; 194/906; 414/280; 360/92; 312/305

[56] References Cited

U.S. PATENT DOCUMENTS

| | | | |
|---|---|---|---|
| 4,221,440 | 9/1980 | Morgan | 312/11 |
| 4,287,541 | 9/1981 | Tanahashi | 360/92 |
| 4,519,522 | 5/1985 | McElwee | 221/13 |
| 4,842,161 | 6/1989 | Krakauer | 221/122 X |

FOREIGN PATENT DOCUMENTS 57-176560 10/1982 Japan.

*Primary Examiner*—Robert P. Olszewski
*Assistant Examiner*—Dean A. Reichard
*Attorney, Agent, or Firm*—Ladas & Parry

[57] ABSTRACT

An automatic dispenser for the sale/exchange of video cassettes/compact discs and similar. The products are housed on a rotary drum inside respective peripheral radial compartments arranged side by side in two concentric rings of the same diameter and occupying the same radial position. Drive means controlled by electronic control means provide for selectively rotating the drum by a given number of fractions of a turn equal to half the circumference of each compartment, so as to selectively position the compartments facing two withdrawal slots formed through a panel on the dispenser parallel to the axis of rotation of the drum, which slots are offset heightwise by an amount substantially equal to half the circumference of the compartments.

6 Claims, 2 Drawing Sheets

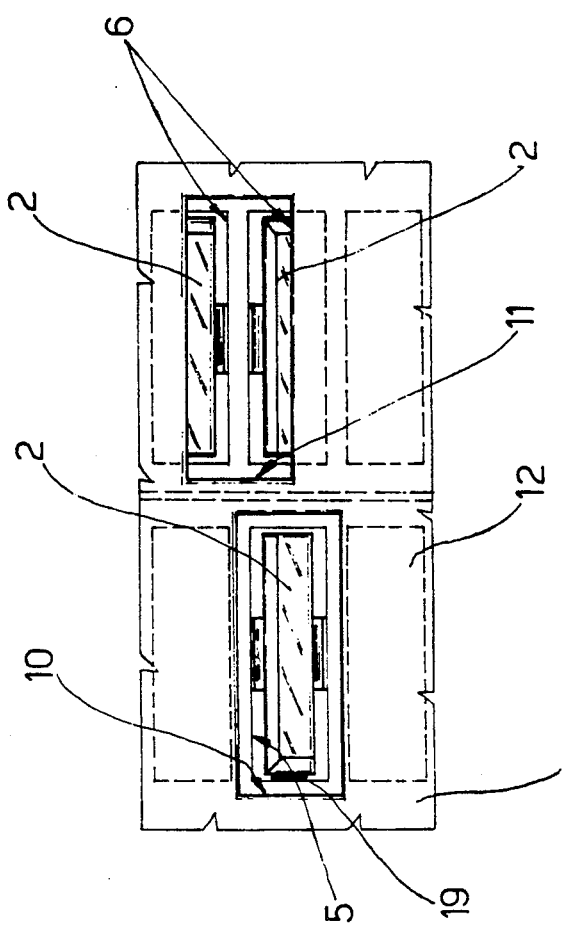
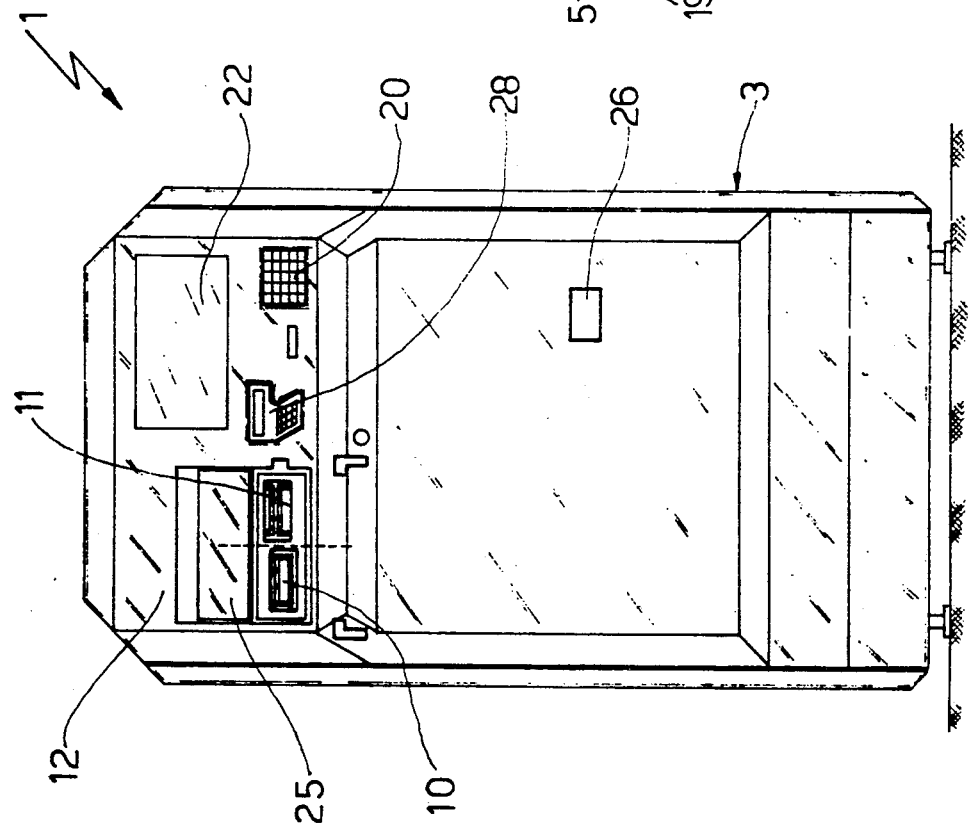

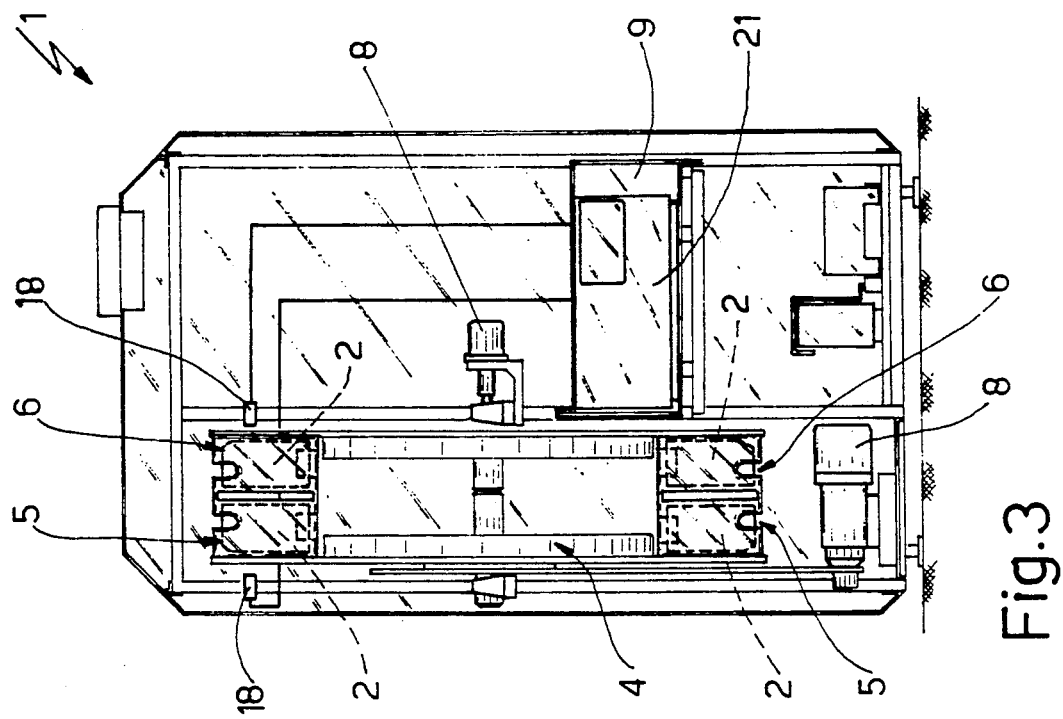
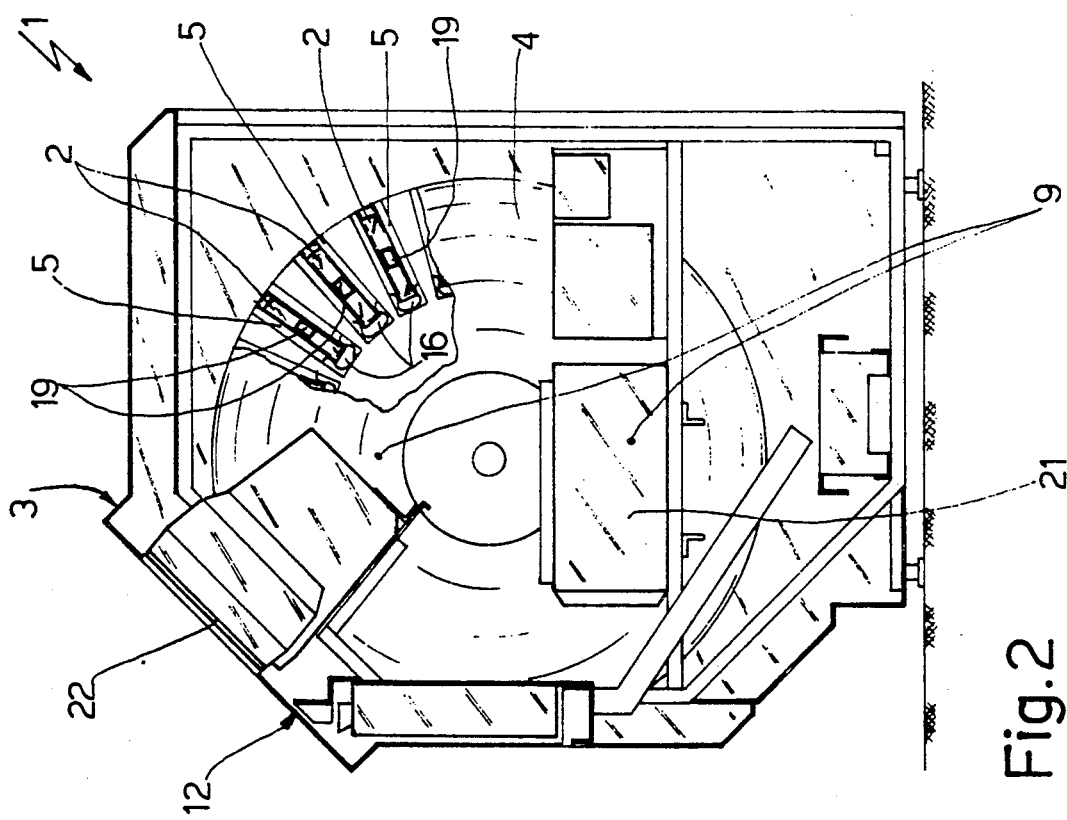

AUTOMATIC DISPENSER, PARTICULARLY FOR AUDIO/VIDEO PRODUCTS

BACKGROUND OF THE INVENTION

The present invention relates to an automatic dispenser, particularly for audio/video products, such as video cassettes and/or so-called compact discs.

French Patent n.2.622.090 relates to an automatic dispenser for video cassettes housed inside radial compartments on a rotary storage drum. As compared with currently marketed automatic dispensers, in which the cassettes are stored on shelves and withdrawn mechanically, this provides for a more compact dispenser, lower production and running costs by simplifying the mechanical design, and more storage space for a given size dispenser.

SUMMARY OF THE INVENTION

It is an object of the present invention to further improve the performance of the automatic dispenser according to the above French patent, in particular by enabling storage of a large number of products on relatively small diameter drums, and simplifying as far as possible the mechanical operations required for withdrawing (and possibly exchanging) the products.

According to the present invention, there is provided an automatic dispenser, particularly for audio/video products such as video cassettes and/or compact discs, comprising a rotary storage drum on which said products are housed inside respective peripheral radial compartments, characterised by the fact that said compartments are arranged in two concentric rings of the same diameter, the compartments of one ring being arranged beside and in the same radial position as those of the other ring; said dispenser also comprising drive means, controlled by electronic means, for selectively rotating said drum by a predetermined number of fractions of a turn equal to half the circumference of each said compartment, so that said compartments selectively fact two withdrawal slots, one for each said ring of compartments, formed through a panel on the dispenser parallel to the axis of rotation of said drum; said slots being offset heightwise by an amount substantially equal to half the circumference of said compartments.

BRIEF DESCRIPTION OF THE DRAWINGS

A non-limiting embodiment of the present invention will be described by way of example with reference to the accompanying drawings, in which:

FIG. 1 shows a front view of a dispenser in accordance with the present invention;

FIGS. 2 and 3 show schematic side and front views respectively of the inside of the FIG. 1 dispenser;

FIG. 4 shows a larger-scale view of a detail in FIG. 1.

DETAILED DESCRIPTION OF THE INVENTION

Number 1 in FIGS. 1 to 4 indicates a dispenser for vending and/or exchanging audio/video products 2, particularly video cassettes and/or compact discs, or any other type of product having the same handling characteristics.

As shown by way of example, the dispenser according to the present invention comprises a known housing 3 containing the operating mechanisms. These comprise a rotary storage drum 4 according to the teachings of French Patent n.2.622.090, on which the products 2 are housed inside respective identical radial compartments 5 and 6 equally spaced about the periphery of drum 4. According to a first characteristic of the present invention, said compartments are arranged in two concentric rings of the same diameter, the compartments 5 in a first ring (to the left in the example shown in FIG. 3) being arranged beside and in the same radial position as compartments 6 in the other ring. Device 1 also comprises means 8 for driving drum 4 and which are controlled by electronic means 9. According to a second characteristic of the present invention, said means 8 and 9 are so designed as to selectively rotate drum 4 by a given number of fractions of a turn of given size. According to the present invention, means 8 and 9 are set so that each fraction of a turn equals half the circumference of each compartment 5 and 6, and so that compartments 5 and 6 selectively face two withdrawal slots 10 and 11 formed through a panel 12 forming part of housing 3 and parallel to the axis of rotation of drum 4.

In particular, slots 10 and 11 are arranged respectively facing side by side rings of compartments 5 and 6. According to the present invention, slots 10 and 11, which are large enough to enable manual withdrawal of the product inside compartments 5 and 6, are offset heightwise by an amount substantially equal to half the circumference of compartments 5 and 6. Thus, in conjunction with said first characteristic and as shown clearly in FIG. 4, when drum 4 is rotated so that a compartment 5 is positioned facing slot 10 and accessible by the user, slot 11, by virtue of being offset in relation to slot 10 by an amount equal to half the circumference of compartments 5 and 6, presents the top and bottom halves of two adjacent compartments 6, neither of which is accessible by the user. Similarly, if drum 4 is rotated so as to position a compartment 6 facing slot 11 and accessible by the user, slot 10 will present the top and bottom halves of two adjacent compartments 5.

Roughly speaking, if each ring consists of a hundred compartments 5 and 6, means 8 and 9 are designed to rotate drum 4 by a minimum two-hundredth of a turn, so that, for every two-hundredth of a turn, a compartment 5 or 6 is positioned respectively facing slot 10 or 11. Or, to put it another way, every two two-hundredths of a turn, a compartment 5 or 6 is rotated so as to respectively face slot 10 or 11, said compartments 5 and 6 being offset in relation to each other by one two-hundredth of a turn, by virtue of slots 10 and 11 also being offset, in this case, by one two-hundredth of a turn of drum 4. For a given diameter of drum 4, therefore, twice the number of products 2 can be stored, as compared with known dispensers, with no complex design modifications required.

According to a further characteristic of the present invention, compartments 5 and 6 are provided inside with means for retaining products 2, said means consisting, in the example shown, of known elastic gripping elements 16 (FIG. 2) between/from which products 2 are inserted/extracted manually by the user. Elements 16 are obviously set so that the force required for inserting/extracting products 2 is greater than the weight of the product, thus enabling products 2 to be inserted/extracted easily while at the same time preventing them from dropping out of compartments 5 and 6 when the inlet is arranged facing downwards.

According to the preferred embodiment shown, at least one compartment 5 or 6 on drum 4 is left empty, in which case, dispenser 1 also comprises sensor means 18, e.g. bar code readers, for reading respective identification labels 19 affixed to products 2. Sensor means 18 are connected to electronic control means 9, which, subsequent to a request entered by the user via keyboard 20 on panel 12, provide for positioning empty compartment 5 or 6 facing slot 10 or 11; for identifying the product 2 inserted by the user inside said empty compartment 5 or 6, by reading said label 19; and, upon product 2 being identified, for enabling the user to withdraw another product 2 from another compartment 5 or 6, that is, to exchange products 2. For performing the above functions, electronic control means 9 consist of a known electronic computer 21 housed together with drum 4 and drive means 8 inside housing 3 and connected to keyboard 20. Computer 21 also comprises a display screen 22 inside panel 12, which, subsequent to a request by the user via keyboard 20, provides for displaying information concerning the products 2 housed on drum 4, and for enabling interactive communication with the user for selecting the product for withdrawal.

Dispenser 1 also comprises a safety cover 25, e.g. a sliding cover of the type used on automatic cash withdrawal systems, for covering and preventing access to slots 10 and 11; and known payment receiving means 26 (for cash, credit cards, prepaid cards or subscriptions) also connected to and controlled by computer 21, which, subsequent to a request by the user via keyboard 20, is so programmed as to only operate drum 4 and slide open cover 25 subsequent to payment of the required sum via means 26. According to one variation, in addition to slots 10 and 11, cover 25 may be sized to cover the whole of panel 12, or at least keyboard 20 and display 22, in which case, dispenser 1 will also present known means 28, accessible even with cover 25 closed, for supplying computer 21 with an identification code (key-operated code number, magnetic card, or both) for sliding open cover 25 and enabling keyboard 20 and display 22.

By appropriately programming computer 21, dispenser 1 may operate as follows. Via means 28, which are accessible at all times, the user is identified, for example, by keying a personal code number. This may also be used for enabling or disabling withdrawal of certain products 2, such as video cassettes for adult viewing only. Once the user has been identified, computer 21 enables keyboard 20 and screen 22 on which a user guide menu may be shown with instructions for determining the content of available products 2. This information is called up by computer 21 from a mass storage memory, which may also comprise image storage CD-ROM readers, and is shown on screen 22.

When the product is selected, e.g. by keying its identification code number, computer 21, in which the position of the respective compartment 5 or 6 is memorised, activates drum 4 so as to position the compartment facing slot 10 or 11. Before doing so, however, the computer, by means of a message on screen 22, enquires whether the product is to be purchased or exchanged. In the case of an exchange operation, drum 4 is rotated so as to position empty compartment 5 or 6 facing respective slot 10 or 11, slides open cover 25, and instructs the user to place the return product inside empty compartment 5 or 6. Computer 21 then checks that the product has been inserted and is acceptable (by reading the code number on label 19), instructs the user to insert the exchange fee via means 26, and rotates drum 4 to position the compartment containing the required product 2 facing slot 10 or 11. In the case of a purchase operation, computer 21 simply instructs the user to insert the purchase fee via means 26.

Whether purchased or exchanged, the required product is rotated on drum 4 so as to face slot 10 or 11 from which it can be removed from compartment 5 or 6. The products to the right or left of the withdrawal ring, however, are prevented from being withdrawn by virtue, as already described, of being offset in relation to the withdrawal slot. Once the product is withdrawn, cover 25 slides down and dispenser 1 awaits the next operating cycle, after first memorising the code number of the withdrawn/returned product, which, in the next cycle, will be indicated as being unavailable/available.

I claim:

1. An automatic dispenser, particularly for audio/video products such as video cassettes and/or compact discs, comprising a rotary storage drum on which said products are housed inside respective peripheral radial compartments, characterised by the fact that said compartments are arranged in two concentric rings of the same diameter, the compartments of one ring being arranged beside and in the same radial position as those of the other ring; said dispenser also comprising drive means, controlled by electronic means, for selectively rotating said drum by a predetermined number of fractions of a turn equal to half the circumference of each said compartment, so that said compartments selectively face two withdrawal slots, one for each said ring of compartments, formed through a panel on the dispenser parallel to the axis of rotation of said drum; said slots being offset heightwise by an amount substantially equal to half the circumference of said compartments.

2. A dispenser as claimed in claim 1, characterised by the fact that said compartments are provided inside with means for retaining said products.

3. A dispenser as claimed in claim 2, characterised by the fact that said retaining means consist of elastic gripping elements between and from which said products are inserted and released when inserted and extracted from said compartments.

4. A dispenser as claimed in claim 1,
characterised by the fact that at least one said compartment on said drum is left empty; said dispenser also comprising sensor means for reading respective identification labels on said products, and connected to said electronic control means; said electronic control means being designed, subsequent to a user request entered via a keyboard on said panel, to position said empty compartment facing one of said slots, to identify a product inserted by the user inside said empty compartment, and, subsequent to positive identification of said product, to enable the user to withdraw another said product from another said compartment in exchange for said product inserted inside said empty compartment.

5. A dispenser as claimed in claim 4, characterised by the fact that said electronic control means consist of an electronic computer housed, together with said drum and said drive means, inside a housing of which said panel with said withdrawal slots forms part; said computer comprising a display screen on said panel, for displaying, subsequent to a user request via said keyboard, information concerning the products stored on said drum, and for enabling interactive communication with the user for selecting the product for withdrawal.

6. A dispenser as claimed in claim 1, characterised by the fact that it comprises a cover at least for said slots; payment receiving means controlled by said electronic control means, which only activate said drum subsequent to payment by the user of the required sum via said receiving means; and means whereby the user supplies said electronic control means with an identification code number for removing said cover.

* * * * *